United States Patent [19]

Yen et al.

[11] 4,119,262
[45] Oct. 10, 1978

[54] METHOD OF JOINING METAL, PARTICULARLY ALUMINUM OR ALUMINUM ALLOYS, USING BROMINE FLUXING AGENT

[75] Inventors: Chia-Ming Yen, Canton Township, Wayne County; Duane J. Schmatz, Dearborn Heights, both of Mich.

[73] Assignee: Ford Motor Company, Dearborn, Mich.

[21] Appl. No.: 813,057

[22] Filed: Jul. 5, 1977

[51] Int. Cl.² ............................ B23K 1/04; B23K 35/38
[52] U.S. Cl. ................................ 228/206; 228/212; 228/220; 228/223; 148/26
[58] Field of Search ............... 228/217, 219, 220, 223, 228/212, 206; 148/26

[56] References Cited

U.S. PATENT DOCUMENTS

| | | | |
|---|---|---|---|
| 2,585,819 | 6/1946 | Moore et al. | 228/220 X |
| 2,674,790 | 4/1954 | Edson et al. | 228/219 |
| 2,674,791 | 4/1954 | Edson et al. | 228/219 |
| 3,440,712 | 4/1969 | Stroup et al. | 228/220 X |
| 3,713,206 | 1/1973 | Galmiche et al. | 228/219 X |
| 3,754,698 | 8/1973 | Bochinski et al. | 228/223 X |

*Primary Examiner*—Al Lawrence Smith
*Assistant Examiner*—K J Ramsey
*Attorney, Agent, or Firm*—Joseph W. Malleck; Olin B. Johnson

[57] ABSTRACT

A method of brazing metal, particularly aluminum members, is disclosed which employs gaseous bromine as a fluxing agent. The fluxing agent is introduced as an additive to a through-flowing protective or inert atmosphere in the brazing furnace.

8 Claims, 3 Drawing Figures

U.S. Patent  Oct. 10, 1978  4,119,262
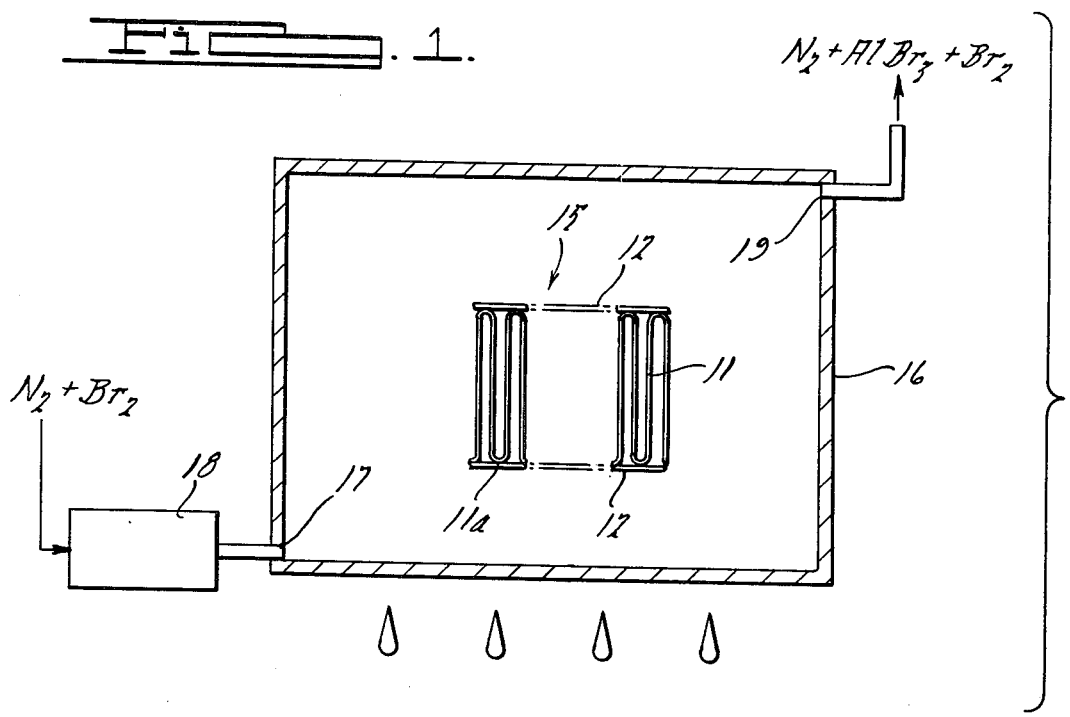
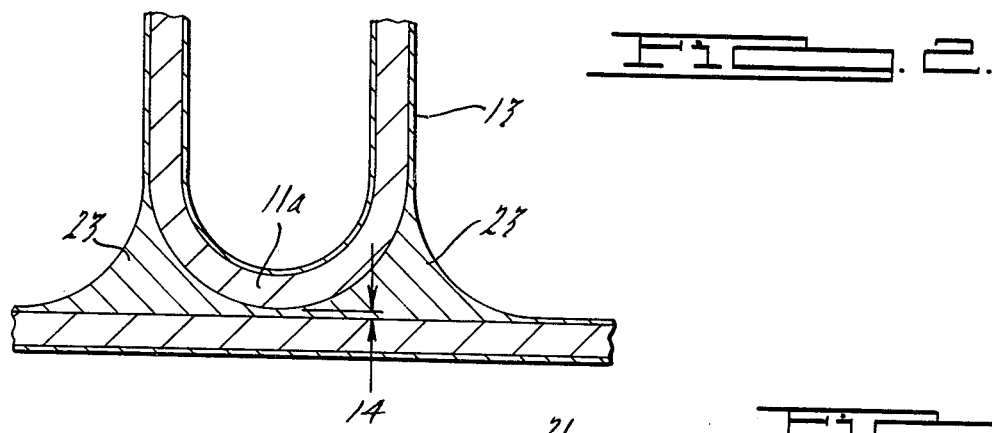
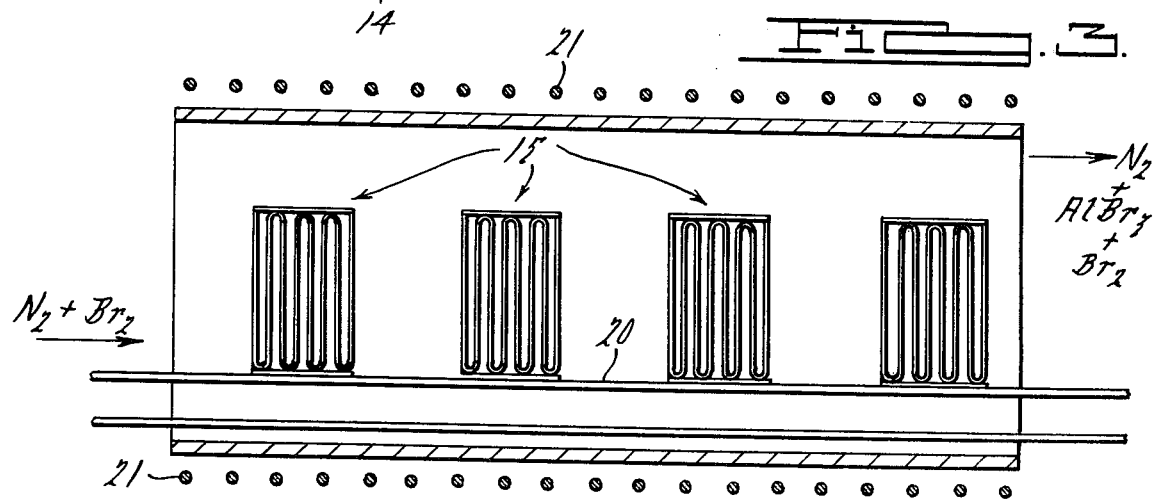

METHOD OF JOINING METAL, PARTICULARLY ALUMINUM OR ALUMINUM ALLOYS, USING BROMINE FLUXING AGENT

BACKGROUND OF INVENTION

Although many brazing modes have been employed to join aluminum pieces together, they can be divided principally into the flux and fluxless methods. In a fluxless brazing method, a high vacuum is required to eliminate the formation of oxides which inhibit bonding. The use of a vacuum is disadvantageous because of the time required to pump air out of the brazing chamber and because of the necessity for a good vacuum apparatus which is expensive. The filler metal typically employed for fluxless aluminum brasing is an aluminum alloy typically containing 7.0-8.0% silicon and 1.5-2.5% magnesium.

With a flux method, a chemical is coated onto the surfaces to be joined and is displaced by the brazing filler metal under proper heat conditions. Although this method is cheaper because it is carried out under ambient atmosphere conditions, there often is left a flux residue which promotes galvanic corrosion. Accordingly, the brazed part must be subjected to a complicated cleaning procedure following brazing, but even this cleaning procedure is not capable of removing all the chemicals completely. Accordingly, a flux type brazing method will not achieve the strength of fluxless vacuum brazing. A typical filler metal employed for the flux type method is an aluminum alloy containing only 6-12% silicon.

What is needed is a brazing method which has the economy and versatility of a flux type method, coupled with the increased wetting characteristics of a fluxless type of method.

SUMMARY OF THE INVENTION

A primary objective of this invention is to provide an improved flux type method of brazing metal, particularly aluminum, elements which methods employs a flux that can be controlled to react selectively with the base metal and leave no residue on the brazed joint.

Another object is to provide a method of brazing aluminum elements which requires an inert atmosphere, but which atmosphere need not be closely controlled as to dew point or purification.

Yet still another object of this invention is to provide a flux type brazing method for aluminum parts which has increased wetting capability of the filler metal onto the aluminum parts and the flux is controlled to be selective to aluminum.

Features pursuant to the above objects comprise:

(a) heating the assembled metal elements in the presence of flowing nitrogen gas to which is added a controlled volume of gaseous bromine, (b) when aluminum elements are employed, the flowing gas is controlled as to be devoid of water to insure that the bromine is selective to aluminum, (c) heating is carried out interchangeably with natural gas or electric resistance, and (d) the brazing filler material comprises an aluminum based metal containing 7-12% silicon.

SUMMARY OF THE DRAWINGS

FIG. 1 is a schematic view of one type of furnace apparatus within which the inventive process may be carried out;

FIG. 2 is an enlarged view of a portion of the assembled elements which have been subjected to the brazing method of this invention, the view showing an outline of the form the metal takes after such brazing; and FIG. 3 is a schematic view of another type of apparatus within which the inventive process may be carried out.

DETAILED DESCRIPTION

Brazing is a method of joining metal parts with a related alloy whose melting point is below that of the parent metal. Brazing differs from welding in that the parent metal does not get hot enough to melt significantly and play a part in the joining process. It differs from soldering in that brazing is carried out at a higher temperature. For aluminum this is a consequence of using a filler metal of the same base as the metal being joined. In brazing aluminum, the filler metal is always an aluminum-based alloy.

In general, brazing as a joining technique enjoys the same production advantages as soldering with the hope for added advantages of increased strength and high resistance to corrosion. However, these hoped for advantages are not necessarily realized.

A preferred inventive method which will consistently realize these added advantages is as follows:

1. The metal parent members 11 and 12 to be joined are selected. If aluminum, alloys suitable for brazing are typically those in the 1000 and 3000 series for non-heat treatable wrought alloys, and the low magnesium alloys of the 5000 series. Aluminum alloys containing more than 2% magnesium are difficult to flux braze; the oxide film on these alloys is particularly tenacious and hard to remove with ordinary fluxes. Additionally brittle intermetallic constituents may be formed by the combination of silicon in the brazing alloy with the magnesium, producing potentially unreliable joints. The brazing of 5000 series aluminum alloys containing more than 2% magnesium is therefore not recommended for flux brazing. Of the heat treatable aluminum alloys, the most commonly brazed are the 6000 series particularly alloy D6063. Aluminum alloys in the 2000 and 7000 series are low melting and hence normally not brazable. An exception to this is alloy D772.

Although certain high melting casting alloys are brazable, the most common casting alloys have melting ranges too low to be easily brazed. Additionally, the problems of distortion and incipient fusion created when these alloys approach their melting point may make brazing, as a joining technique, impractical in the face of more satisfactory methods of joining. Aluminum die castings are difficult or impossible to braze because of surface blistering due to high gas content.

2. The brazing filler metal 13 is selected and typically contains aluminum-silicon alloys containing 7-12% silicon. Some lowering of melting point can be achieved by the addition of copper and zinc, but only at the expense of decreased corrosion resistance. In its broad aspect, the aluminum based filler alloy for the purposes of this invention can be defined as an aluminum based alloy which melts at a lower temperature than any other parent members being joined. As is also known, brazing filler alloys are available in a number of forms such as wire, shims, wire rings and brazing sheet. For purposes of this invention, the use of brazing sheet has been found most desirable and comprises an aluminum alloy core and integral layers of aluminum brazing alloy clad thereonto.

Essentially the brazing process adopted determines the filler metal used. In flame brazing, rod or wire is fed to the joint by hand. In furnace and flux dip brazing, prepositioned rod or strip is most commonly utilized. Brazing commonly utilizes a filler paste which can be applied by brush. However, the most convenient is that of brazing sheet which provides for the manufacture of complex assemblies which are to be massed produced. The sheet consists of a standard alloy core clad on one or both sides with an appropriate filler metal which greatly facilitates joining by brazing. The sheet can be readily formed by methods normally used with aluminum, such as bending, roll forming, etc.

3. The parent members are then cleaned according to customary techniques in the art. Any oil or grease should be removed. It is preferable that the oxide coating in the vicinity of the joint be removed, for example by chemical or mechanical cleaning, particularly where the members were previously heat treated since the oxide coating is especially tenacious due to furnace exposure. Chemical etchants are known to serve this purpose such as nitric acid or hydrofluoric acid. The concentration of such etchants can vary within 10-80% by volume, depending on exposure time allotted to cleaning. The members preferably are brazed within 48 hours after cleaning to minimize and oxide film accumulation.

4. After cleaning, some of the parent members are assembled together with brazing filler alloy; they are placed together in joining relationship in a configuration intended to be fixed by the brazing operation. They may be held by clamps, jigs or other means known in the art. It is important that the joint design make great use of fillets. Clearances at the joining site should be no greater than 0.020 inches as shown at 14 in FIG. 2. To assure zero clearance at substantially all joining sites of a complex assembly, clamping is employed such as wrapping with nichrome wire. This insures that all joints will be zero clearance except for a few random ones which will be controlled to 0.020 inch or less.

In carrying out the method herein, Alcoa cladding sheet #12 has been used which is comprised of a 3003 aluminum alloy core and a cladding alloy comprised of 7.5% silicon. The sheet is roll formed to define a radiator core 15 comprised of a number of convolutions or folds (member 11). The folds are arranged to be brazed at their apices 11a to flat strips of aluminum metal (members 12). The folds and strips are maintained in close relationship with no clearance at 14 for substantially most sites when clamped.

5. As shown in FIG. 1, the assembly to be brazed is preferably placed in a gas fired furnace 16 which is adapted to having a continuous flow of inert gas therethrough comprised principally of nitrogen. The flow is introduced at 17 and controlled by means 18 as to volume and rate. The gas exits at 19. Heating is carried out to a point where the clad brazing alloy reaches its molten range (1100° F.-1140° F.). The nitrogen flow is maintained without any dew point control or purification; it is taken directly from a tank of nitrogen commercially available which is 99.95% pure. Up to the point of reaching the molten condition of the brazing alloy, no flux has been utilized. Heating may alternatively be carried out by use of an electric furnace 20, having resistance coils 21, as shown in FIG. 3. The assemblies may be continuously fed therethrough.

6. Approximately at the point where the clad brazing alloy reaches its molten range, gaseous bromine is added at 17 through controller means 18 to the flow of nitrogen gas by opening a valve above a tank of liquid bromine. The addition of the gaseous bromine is maintained from 30 seconds to 4 minutes, (operably from 5 seconds to 6 minutes depending on size of brazing parts and the rate of gas flow) and is added in a volume as little as approximately 1% or more by volume of the flow of nitrogen (operably as little as 0.5-1.5% by volume of the nitrogen will make). This amount of gaseous bromine is very small, but yet accomplishes the needed successful fluxing. The nitrogen and bromine gas is maintained substantially devoid of moisture so that bromine will react selectively with the aluminum.

During heating of the clad brazing alloy to a molten condition, numerous tiny fissures will be formed in the aluminum oxide film overlaying the aluminum clad sheet. These tiny fissures are due to the difference in thermal expansion between the aluminum oxide and the brazing alloy. The brazing alloy, exposed at the fissures, will then react with the gaseous bromine forming an aluminum bromine, $AlBr_3$, through the reaction: $Al + 3Br \rightarrow AlBr_3$. This reaction and volatilization of $AlBr_3$ widens the fissures and further breaks up the oxide film leading to more mutual wetting of the components to be joined. Due to the gaseous nature of the flux, it is constantly cleaning the surface of the filler metal and parent parts when exposed. This is a most efficient wetting mechanism. When the clad brazing alloy becomes molten it forms a fillet 23 between the aluminum cores at the brazing sites. The filler metal is distributed between the mating surfaces of the joint by capillary action and gravity.

If a controlled amount of moisture is added to the flowing inert gas or bromine fluxing gas, the selectivity of bromine gas for aluminum can be changed so that brazing of other metal elements, such as iron, nickel, lead, zinc can be accomplished.

There are several advantages which are obtained by using bromine as the fluxing agent when brazing aluminum:

(a) there is no visible depository of a fluxing residue. Both the fluxing agent, bromine, and the reaction product $AlBr_3$, are gaseous phases at elevated temperatures. These gases can be easily carried away by the purging gas (nitrogen) at elevated temperatures.

(b) gaseous bromine can be easily obtained from liquid bromine which is volatile (vapor pressure equals 400mm Hg at 169° F.), (c) bromine reacts with metals selectively; while bromine reacts vigorously with aluminum it is inert to iron, nickel, lead, zinc and magnesium in the absence of water, (d) the reaction product between aluminum and bromine (fluxing product in this case), aluminum bromide, is also volatile at elevated temperatures (boiling point = 150° F.) and is readily soluble in cold water, (e) control of the process is relatively simple; no purification or dew point control of nitrogen, which is required by most other inert gas aluminum brazing processes, appear necessary. Inert gases other than nitrogen can also be used, such as helium or argon.

(f) the timing and amount of gaseous bromine introduced into the brazing area can be conveniently controlled by the opening of the regulating valve and by the temperature of liquid bromine.

Although bromine is sometimes viewed with suspicion because of its toxic nature, it is used in the process in only very small amounts for a short period of time during the final stage of brazing. Therefore, its risk of hazard is very small because its strong odor will give an early warning to personnel working in the area if there is a leakage. Environmental problems should not arise if proper precautions are taken. The exhaust gas from this process can be passed through an absorbant to remove residual bromine before it is allowed to enter the atmosphere.

We claim as our invention:

1. A method of brazing aluminum members, comprising:
   (a) cleaning said aluminum members to be substantially free of oxide,
   (b) bringing said aluminum members into joining relationship to provide an assembly having joining sites, said assembly being comprised of said members and of an aluminum-based brazing alloy disposed at the joining sites,
   (c) heating said assembly while flowing an inert gas through and about said assembly,
   (d) when said aluminum-based brazing alloy has reached a molten state, introducing a gaseous bromine fluxing agent to said inert gas in a quantity of about 1% by volume of said inert gas, and continuing said introduction for a period of 3–5 minutes while maintaining said heating level.

2. The method as in claim 1 in which the inert gas is substantially devoid of moisture.

3. In a method of brazing aluminum members, wherein at least one of said members is comprised of an aluminum clad material having a core consisting of said aluminum members related together be as an assembly for being joined at selected sites, said assembly being subjected to heating within a furnace having a through flow of nitrogen gas, the improvement comprising: when the aluminum cladding has been heated to a molten condition and the oxide film has been sufficiently heated to form fissures therein, introducing a bromine gas to said through flowing nitrogen in a sufficient quantity to provide a chemical reaction between aluminum and bromine in a manner to widen said fissures and promoting wetting between molten filler metal and mating parts.

4. A method of bonding aluminum comprising:
   (a) heating aluminum components separated at the joining sites by a clad brazing material, said heating being carried out in the absence of an oxidizing atmosphere and for a period of time to reduce the clad brazing material to a molten condition,
   (b) subjecting said joining sites to gaseous bromine which is effective to react with the aluminum components exposed by fissures in the aluminum oxide coating resulting from differential thermal expansion of the oxide coating and aluminum components,
   (c) displacing the product of said bromine and aluminum reaction at the interface with the mating parts with a molten clad brazing material, and
   (d) allowing said assembly to cool with the brazing material in intimate joining contact with the two aluminum members.

5. The method as in claim 1, in which said cleaning is carried out chemically by the use of either nitric acid or hydrofluoric acid in concentrations of 10–80% by volume, rinsing and then drying said elements to prevent oxides or water vapor from contamination the brazing sequence.

6. The method as in claim 1, in which the aluminum-based brazing alloy essentially contains 7–12% silicon.

7. The method as in claim 1, in which said assembly is maintained and clamped secure to maintain a zero clearance at substantially all joining sites.

8. The method as in claim 1, in which the assembly is flushed for a period of 2 minutes with commercial grade nitrogen having up to 0.05% impurities following the addition of bromine.

* * * * *